United States Patent
Shi et al.

(10) Patent No.: US 11,243,413 B2
(45) Date of Patent: Feb. 8, 2022

(54) HARD CORNEAL CONTACT LENS

(71) Applicant: Bo-Yan Shi, Guangdong (CN)

(72) Inventors: Bo-Yan Shi, Guangdong (CN); Mei-Li Huang, Guangdong (CN)

(73) Assignee: Bo-Yan Shi, Huadu Guangzho (CN)

( * ) Notice: Subject to any disclaimer, the term of this patent is extended or adjusted under 35 U.S.C. 154(b) by 282 days.

(21) Appl. No.: 16/495,053

(22) PCT Filed: May 28, 2017

(86) PCT No.: PCT/CN2017/086456
§ 371 (c)(1),
(2) Date: May 6, 2020

(87) PCT Pub. No.: WO2018/166075
PCT Pub. Date: Sep. 20, 2018

(65) Prior Publication Data
US 2020/0341297 A1     Oct. 29, 2020

(30) Foreign Application Priority Data
Mar. 17, 2017  (CN) .......................... 201710159279.1

(51) Int. Cl.
*G02C 7/04* (2006.01)

(52) U.S. Cl.
CPC .............. *G02C 7/044* (2013.01); *G02C 7/047* (2013.01); *G02C 7/049* (2013.01)

(58) Field of Classification Search
CPC ......... G02C 7/044; G02C 7/049; G02C 7/047
USPC ..................................................... 351/159.12
See application file for complete search history.

(56) References Cited

U.S. PATENT DOCUMENTS

| | | | | |
|---|---|---|---|---|
| 2,196,066 A | * | 4/1940 | Feinbloom | G02C 7/047 351/219 |
| 5,502,518 A | * | 3/1996 | Lieberman | G02C 7/047 351/159.2 |
| 8,113,652 B2 | * | 2/2012 | Legerton | G02C 7/041 351/159.12 |

(Continued)

*Primary Examiner* — James R Greece
(74) *Attorney, Agent, or Firm* — Chun-Ming Shih; HDLS IPR Services

(57) ABSTRACT

A rigid corneal contact lens comprises a front-surface optical zone and a back-surface optical zone: the front-surface optical zone comprises a front-surface central zone (1) and a defocusing zone (2) at the periphery of the front-surface central zone (1); the front-surface central zone (1) is spherical; the defocusing zone (2) has a radius of curvature decreasing from the outside of the front-surface central zone (1) continuously and a minimum radius of curvature which ranges from 95% to 50% of the radius of curvature of the front-surface central zone (1). Because of the structure of a human eye, the phenomenon of peripheral hyperopic defocus exist in human eyes, that is, central image points for an image are projected on macula foveal of retina and peripheral image points are projected behind retina. As shown in experimental evidences, peripheral hyperopic defocus is the main cause of myopia development which can be moderated by restraining peripheral hyperopic defocus. In this present disclosure, a rigid corneal contact lens featuring stronger refractive power at the lens's periphery than at the lens's central area contributes to moderating peripheral hyperopic defocus for myopia control.

3 Claims, 1 Drawing Sheet

(56) References Cited

U.S. PATENT DOCUMENTS

| | | | | |
|---|---|---|---|---|
| 8,801,175 B2* | 8/2014 | Legerton | .......... | B29D 11/00038 |
| | | | | 351/159.12 |
| 8,992,010 B2* | 3/2015 | Ho | ........................ | G02C 7/044 |
| | | | | 351/159.23 |
| 2002/0159025 A1* | 10/2002 | Legerton | ................ | G02C 7/047 |
| | | | | 351/159.1 |
| 2006/0152673 A1* | 7/2006 | Cotie | ..................... | G02C 7/047 |
| | | | | 351/159.34 |
| 2009/0303434 A1* | 12/2009 | Tung | ...................... | G02C 7/047 |
| | | | | 351/159.06 |
| 2009/0303442 A1* | 12/2009 | Choo | ..................... | G02C 7/047 |
| | | | | 351/246 |
| 2010/0128224 A1* | 5/2010 | Legerton | .................. | G02C 7/04 |
| | | | | 351/247 |
| 2011/0153012 A1* | 6/2011 | Legerton | ................ | G02C 7/047 |
| | | | | 351/159.23 |
| 2012/0212704 A1* | 8/2012 | Legerton | ................ | G02C 7/047 |
| | | | | 351/159.74 |
| 2012/0320334 A1* | 12/2012 | Ho | .......................... | G02C 7/04 |
| | | | | 351/159.12 |
| 2013/0182215 A1* | 7/2013 | Tung | ........................ | G02C 7/06 |
| | | | | 351/159.05 |
| 2014/0043588 A1* | 2/2014 | Grant | ................. | A61K 38/4886 |
| | | | | 351/247 |
| 2015/0138500 A1* | 5/2015 | de Juan, Jr. | ............ | G02C 7/049 |
| | | | | 351/159.04 |
| 2017/0052390 A1* | 2/2017 | Tung | ................. | G02C 7/041 |
| 2020/0041816 A1* | 2/2020 | Gifford | ..................... | G02C 7/049 |

* cited by examiner

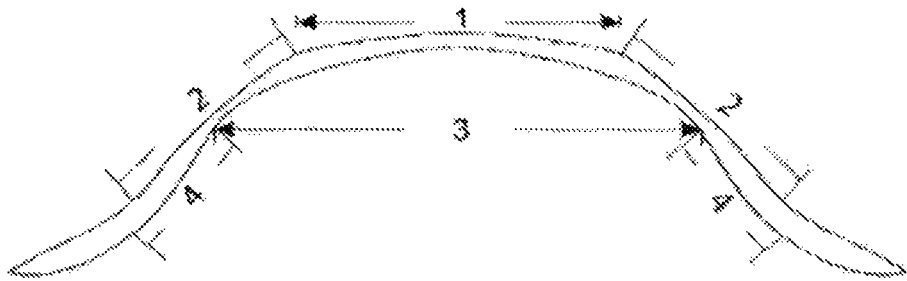

HARD CORNEAL CONTACT LENS

REFERENCE TO RELATED APPLICATIONS

The present application is based on PCT application number PCT/CN2017/086456, filed May 28, 2017, the disclosure of which is hereby incorporated by reference herein in its entirety.

BACKGROUND OF THE INVENTION

Field of the Invention

The present disclosure relates to a rigid corneal contact lenses.

Description of the Prior Art

A rigid corneal contact lenses is a lens customarily used to correct the visual acuity of a myopic patient and having a spherical front-surface optical zone (a 6 mm-to-8 mm region around the center of a lens) with an identical radius of curvature and has been also known as a mono-focal lens.

In the optometry, the phenomenon of paracentral hyperopic defocus existing in human eyes means a same object imaged onto retina is presented by central image points projected on the central area of retina as well as peripheral image points projected behind retina. The phenomenon of paracentral hyperopic defocus has been proven as the main cause of myopia development which can be moderated by restraining paracentral hyperopic defocus. Moreover, a user who wears off-the-shelf mono-focal lenses suffers from myopia which develops due to paracentral hyperopic defocus.

SUMMARY OF THE INVENTION

The present invention provides a rigid corneal contact lens to solve the existing rigid cornea Contact lens users may have technical problems with the development of myopia due to peripheral hyperopia.

In order to solve the above technical problems, the technical solution adopted by the present invention is: a rigid contact lens comprising a front surface optical area and a back surface optical area wherein the front surface optical area includes a central optical zone and a peripheral defocus area around the central optical zone of the front surface, the central area of the front surface is spherical, the radius of curvature of the defocus area continuously decreases from the outside of the central optical zone of the front surface, and the minimum curvature of the defocus area, the radius is 95% to 50% of the radius of curvature of the central area of the front surface.

The back surface optical zone includes a central optical zone and a reverse region located around the central region of the back surface. The central optical zone of the back surface is spherical. The radius of curvature of the reverse region is from the outer side of optical zone begins to decrease continuously, and the minimum radius of curvature of the reverse area is 98%-80% of the radius of curvature of the center optical zone of the back surface.

The front-surface central zone features a radius of curvature between 5.0 mm and 30.0 mm as well as a projecting plane with a radius between 1.0 mm and 3.0 mm; the back-surface central zone features a radius of curvature between 5.0 mm and 30.0 mm as well as a projecting plane with a radius between 2.0 mm and 6.0 mm.

The defocusing zone is defined as a region from the edge of the front-surface central zone to a boundary about 4.0 mm away from the lens's center; the reverse zone is defined as a 1.0 mm-to-4.0 mm annulus outside the back-surface central zone.

Based on the above technical measure for a same object imaged onto retina, the central image points of the object are projected on the central area of retina and the peripheral image points of the object present myopic shift without a technical problem of irreducible peripheral hyperopic defocus common in an existing rigid corneal contact lens because of the front-surface optical zone comprising a front-surface central zone and a defocusing zone at the periphery of the front-surface central zone, the spherical front-surface central zone, the defocusing zone with a radius of curvature decreasing from the outside of the front-surface central zone continuously and a minimum radius of curvature which ranges from 95% to 50% of the radius of curvature of the front-surface central zone.

BRIEF DESCRIPTION OF THE DRAWINGS

The techniques of present invention would be more understandable from the detailed description given herein below and the accompanying FIGURES are provided for better illustration, and thus description and FIGURES are not limitative for present invention, and wherein:

FIG. 1 is a schematic view for the structure of a rigid corneal contact lens in embodiment 1 and illustrates a front-surface central zone marked as 1, a defocusing zone marked as 2, a back-surface central zone marked as 3 and a reverse zone marked as 4.

DETAILED DESCRIPTION OF THE INVENTION

Embodiment 1

As shown in FIG. 1, a rigid corneal contact lens comprises a front-surface optical zone and a back-surface optical zone: the front-surface optical zone comprises a front-surface central zone and a defocusing zone at the periphery of the front-surface central zone; the front-surface central zone is spherical; the defocusing zone has a radius of curvature decreasing from the outside of the front-surface central zone continuously and a minimum radius of curvature which ranges from 95% to 50% of the radius of curvature of the front-surface central zone; the rear-surface optical zone comprises a back surface central zone and a reverse zone at the periphery of the back-surface central zone; the back-surface central zone is spherical; the reverse zone has a radius of curvature decreasing from the outside of the back-surface central zone continuously and a minimum radius of curvature which ranges from 98% to 80% of the radius of curvature of the back-surface central zone; the front-surface central zone features a radius of curvature between 5.0 mm and 30.0 mm as well as a projecting plane with a radius between 1.0 mm and 3.0 mm; the back-surface central zone features a radius of curvature between 5.0 mm and 30.0 mm as well as a projecting plane with a radius between 2.0 mm and 6.0 mm. The defocusing zone is defined as a region from the edge of the front-surface central zone to a boundary about 4.0 mm away from the lens's center; the reverse zone is defined as a 1.0 mm-to-4.0 mm annulus outside the back surface central zone. When a same object is imaged onto retina, the central image points for the object are projected on the central area of retina and the peripheral image points for the object present myopic shift without a technical problem of irreducible peripheral hyperopic defocus common in an existing Rigid corneal contact lenses.

What is claimed is:

1. A rigid corneal contact lens, comprising a front-surface optical zone and a back-surface optical zone wherein: the front-surface optical zone comprises a front-surface central zone and a defocusing zone at the periphery of the front-surface central zone; the front-surface central zone is spherical; the defocusing zone has a radius of curvature decreasing from the outside of the front-surface central zone continuously and a minimum radius of curvature which ranges from 95% to 50% of the radius of curvature of the front-surface central zone; the back-surface optical zone comprises a back-surface central zone and a reverse zone at the periphery of the back-surface central zone; the back-surface central zone is spherical; the reverse zone has a radius of curvature decreasing from the outside of the back-surface central zone continuously and a minimum radius of curvature which ranges from 98% to 80% of the radius of curvature of the back-surface central zone.

2. The rigid corneal contact lens as claimed in claim 1 wherein: the front-surface central zone features a radius of curvature between 5.0 mm and 30.0 mm as well as a projecting plane with a radius between 1.0 mm and 3.0 mm; the back-surface central zone features a radius of curvature between 5.0 mm and 30.0 mm as well as a projecting plane with a radius between 2.0 mm and 6.0 mm.

3. The rigid corneal contact lens as claimed in claim 2 wherein: the defocusing zone is defined as a region from the edge of the front-surface central zone to a boundary about 4.0 mm away from the lens's center; the reverse zone is defined as a 1.0 mm-to-4.0 mm annulus outside the back-surface central zone.

* * * * *